United States Patent
Zentzis et al.

(10) Patent No.: US 11,953,424 B2
(45) Date of Patent: Apr. 9, 2024

(54) SURFACE TREATMENT OF FLAT PRODUCTS MADE OF ALUMINIUM ALLOYS COMPRISING COLOUR MEASUREMENTS

(71) Applicants: Dirk Zentzis, Tönisvorst (DE); Gernot Nitzsche, Meckenheim (DE); Kathrin Eckhard, Cologne (DE)

(72) Inventors: Dirk Zentzis, Tönisvorst (DE); Gernot Nitzsche, Meckenheim (DE); Kathrin Eckhard, Cologne (DE)

(73) Assignee: SPEIRA GMBH, Grevenbroich (DE)

( * ) Notice: Subject to any disclaimer, the term of this patent is extended or adjusted under 35 U.S.C. 154(b) by 0 days.

(21) Appl. No.: 17/508,275

(22) Filed: Oct. 22, 2021

(65) Prior Publication Data
US 2022/0042904 A1 Feb. 10, 2022

Related U.S. Application Data

(63) Continuation of application No. PCT/EP2020/061619, filed on Apr. 27, 2020.

(30) Foreign Application Priority Data

Apr. 25, 2019 (EP) ..................................... 19171086

(51) Int. Cl.
*G01N 21/25* (2006.01)
*C23G 1/12* (2006.01)
*C23G 1/22* (2006.01)

(52) U.S. Cl.
CPC ............. *G01N 21/25* (2013.01); *C23G 1/125* (2013.01); *C23G 1/22* (2013.01)

(58) Field of Classification Search
CPC . C23G 1/00; C23G 1/125; C23G 1/22; G01N 2021/8918; G01N 21/25; G01N 21/255
See application file for complete search history.

(56) References Cited

U.S. PATENT DOCUMENTS 4,383,042 A * 5/1983 Coggins ............. G01N 33/2045
73/104
4,400,289 A * 8/1983 Geldner ................. C23G 1/025
510/508

(Continued)

FOREIGN PATENT DOCUMENTS

CN 1 427 091 A 7/2003
CN 101142333 A 3/2008

(Continued)

*Primary Examiner* — Duy Vu N Deo
*Assistant Examiner* — Christopher Remavege
(74) *Attorney, Agent, or Firm* — Reinhart Boerner Van Deuren P.C.

(57) ABSTRACT

A method for the surface treatment of flat products made of aluminium alloys. The method includes pickling the flat product, in particular for degreasing the flat product. The method includes carrying out a colour measurement on the surface of the flat product to determine at least one measured colour value after pickling the flat product. The method includes generating output information on the basis of the at least one measured colour value. The output information is indicative of compliance with at least one rule for the measured colour value and outputting or triggering the output of the output information. The invention further relates to a device for the surface treatment of flat products made of aluminium alloys and to a use of a colorimeter which is configured to determine at least one measured colour value in a surface treatment of flat products made of aluminium alloys.

16 Claims, 2 Drawing Sheets

(56) References Cited

U.S. PATENT DOCUMENTS

| | | | | |
|---|---|---|---|---|
| 5,175,502 | A * | 12/1992 | Rodabaugh | G01N 27/06 |
| | | | | 324/438 |
| 6,419,756 | B1 * | 7/2002 | Schlechter | C23G 3/02 |
| | | | | 266/112 |
| 6,494,961 | B2 * | 12/2002 | Simpson | G01N 31/16 |
| | | | | 134/28 |
| 7,575,041 | B2 * | 8/2009 | Odashima | C22F 1/04 |
| | | | | 148/551 |
| 8,834,636 | B2 * | 9/2014 | Barbieri | G01N 21/892 |
| | | | | 134/122 R |
| 10,087,542 | B2 * | 10/2018 | Askin | C25D 11/246 |
| 11,260,439 | B2 * | 3/2022 | Bögershausen | B21B 45/0269 |
| 2002/0139391 | A1 * | 10/2002 | Simpson | C23G 3/023 |
| | | | | 134/57 R |
| 2008/0310700 | A1 * | 12/2008 | Fukusawa | G01N 21/8914 |
| | | | | 382/141 |
| 2010/0269854 | A1 * | 10/2010 | Barbieri | C23G 1/02 |
| | | | | 134/122 R |
| 2015/0211129 | A1 | 7/2015 | Juricic et al. | |
| 2018/0077953 | A1 * | 3/2018 | Demoulin | B65B 55/06 |

FOREIGN PATENT DOCUMENTS

| | | |
|---|---|---|
| CN | 104145050 A | 11/2014 |
| DE | 20 2012 012549 U1 | 4/2013 |
| EP | 0 898 163 A1 | 2/1999 |
| EP | 2 623 639 A1 | 8/2013 |
| JP | S57-035687 A | 2/1982 |
| JP | S59 76885 A | 5/1984 |
| JP | S61-155714 A | 7/1986 |
| JP | H08 304273 A | 11/1996 |
| JP | 2003-528978 A | 9/2003 |
| KR | 2014 0023693 A | 2/2014 |
| WO | WO 2014/023283 A1 | 2/2014 |

\* cited by examiner

SURFACE TREATMENT OF FLAT PRODUCTS MADE OF ALUMINIUM ALLOYS COMPRISING COLOUR MEASUREMENTS

CROSS-REFERENCE TO RELATED PATENT APPLICATIONS

This patent application is a continuation of International Application No. PCT/EP2020/061619, filed on Apr. 27, 2020, which claims the benefit of priority to European Patent Application No. 19171086.2, filed Apr. 25, 2019, the entire teachings and disclosures of both applications are incorporated herein by reference thereto.

FIELD OF THE INVENTION

The invention relates to a method for the surface treatment of flat products made of aluminium alloys, the method comprising pickling the flat product, in particular degreasing the flat product.

BACKGROUND OF THE INVENTION

Flat products made of aluminium and aluminium alloys, such as strips and sheets, are manufactured in particular by rolling processes, wherein the flat product passes through hot rolling and/or cold rolling. Similarly, the flat product can be manufactured by strip casting and subsequent cold rolling. When manufacturing the flat product, rolling oil is typically used for the rolling steps, whose residues remain on the surface of the flat product even after the last rolling pass together with dust and particles. Additionally, the oxide layer is incorporated into the surface of the flat product during the rolling processes due to the influence of the working rollers and mechanical deformation under a high temperature. This deformed surface layer produced in this way has, for certain applications, an undesired structure of an oxide layer on the surface of the flat product. Heat treatments such as intermediate annealing, final annealing, solution or phase annealing, for example, can also be carried out between the individual rolling passes and/or after rolling in order to transfer the structure of the aluminium alloy in the flat products into a specific state and to achieve the desired mechanical properties. In the case of heat treatments, there may result an enrichment of alloy constituents in near-surface regions of the flat products, wherein zinc, silicon, magnesium and copper, for example, occur to a larger extent on the surface.

Flat products made of aluminium alloys are typically subjected to a surface treatment or finishing, in particular since the surfaces of products made of aluminium and aluminium alloys are processed and anodised, coated, adhered and/or lacquered, for example, with subsequent process steps. The flat products must for this reason meet specific requirements for the surface quality in order to prepare the surface for corresponding subsequent process steps which are carried out on the flat product or products or semi-finished products produced therefrom.

A surface treatment of flat products made of aluminium alloys can be carried out by means of pickling the flat product, wherein degreasing of the flat product is brought about, amongst other things. Residues of the rolling process, amongst other things, are removed by means of pickling or degreasing. Residues of the rolling process can, for example, be rolling oil residues and particles, dirt and dust on the surface. Pickling comprises in particular at least partially removing the oxide layer and, if necessary, removing oxides rolled into the surface as well as alloy elements, particles or intermetallic phases enriched on the surface. For certain applications, pickling can, for example, comprise a complete removal of the oxide layer as far as possible and, if necessary, removing oxides rolled into the surface as well as alloy elements, particles or intermetallic phases enriched on the surface.

Pickling comprises a material removal on the surface of the flat product by means of a chemical process. Optimal pickling typically requires here, on the one hand, a practically complete cleaning and a sufficient material removal on the surface in order to ensure, for example, a complete removal of the oxide layer as far as possible. On the other hand, the surface treatment should be economical and enable a high process speed whilst using chemicals as little as possible.

To regulate the pickling, assumptions are usually first made about the pickling rate or the material removal depending on the type, concentration, temperature and the mechanical influence of the chemicals used on the surface of the flat product and comparisons are made with the expected soiling and oxide layer thickness. Using these assumptions, a minimal contact time of the surface of the flat product is determined using one or a plurality of treatment solutions or pickling solutions.

For example, the applicability of the subsequent process steps is also checked, such as by determining the wettability, phosphating ability, adherability of lacquer or adhesives and measuring the spot welding transition resistance on the treated flat products. Such analytics are, however, typically carried out on the basis of samples taken in the laboratory and can therefore be used only in a time-delayed manner and not inline with the surface treatment. A further possibility for assessing the effect of the surface treatment is determining the material removal using gravimetric methods. The weight of the material removal achieved can, however, be very low in comparison to the total weight, often making gravimetric methods impractical due to the associated inaccuracies. In the continuous industrial process, it is also not possible to weigh the identical samples before and after pickling. Since the desired pickling removal is, however, lower than the thickness tolerance of rolled aluminium strips, the pickling removal achieved is not gravimetrically accessible.

To regulate the pickling during the ongoing treatment, the properties of the treatment solution are therefore monitored in the prior art. For example, the aluminium content in the treatment solution can be determined, which is attributed to the removal of the oxide layer and the aluminium alloy in the flat product. If flat products are treated in a bath with a treatment solution, the content of aluminium ions in the bath can, for example, be kept virtually constant or within a determined corridor by a continuous, partial exchange of the treatment solution. In this way, the material removal in relation to the surface can, however, only be roughly estimated and values averaged over extended time periods can be obtained. In particular if a bath is used for different flat products, the treatment parameters can only be regulated insufficiently on the basis of the aluminium content. Different flat products can, for example, consist of different aluminium alloys and be produced by different manufacturing processes.

The determination of the aluminium ion content in an alkaline or acidic treatment solution, just like concentration determination of most other chemicals in the treatment solutions, can typically be carried out only offline on discontinuously taken bath samples. Regulating continuous treatment processes with discontinuous analytics is therefore often significantly delayed.

Furthermore, parameters that are easy to determine online, such as the pH value and the electrical conductivity of the treatment solution, for example, can also be monitored. Another parameter that is easy to determine online can, for example, be the speed and therefore the contact time of the flat product with the at least one treatment solution. The electrical conductivity can be reliably correlated with the concentration of individual lyes or acids in aqueous solutions. If, in contrast, a plurality of components is present in solution simultaneously, sum parameters, such as the electrical conductivity or the pH value only provide orientative values for the concentrations. Thus, the concentration of HF in another mineral acid, for example, cannot be readily tracked, and in particular not online. For a given contact time, the chemical concentrations and their possible influence can therefore only be estimated on the basis of empirical values or discrete laboratory analyses of samples taken.

What is also problematic is that the kinetics of the pickling depends on a number of other parameters. For example, self-inhibiting processes also take place with the treatment, and reaction products can slow down the actual pickling reaction. Therefore, it may happen that even when there is compliance with targets, deviations develop in the pickling reaction, for example by the enrichment of reaction-inhibiting accompanying substances. In this case, a "dropping off" of the treatment solution or bath is mentioned, wherein this effect is also not readily detected by the monitoring of global parameters. Global parameters are generally considered pH value, electrical conductance and the temperature. The targets can therefore, for example, be the target concentrations of the chemicals, certain pH values and electrical conductances.

This problem is exacerbated further if the treatment solution is used to treat different flat products since, for example, the surface quality in regard to enriched alloy constituents, rolling oil residues and dust as well as the thickness of the oxide layer can vary significantly in particular as a function of the alloys used and of the manufacturing process of the flat products.

Similarly, the pickling result can be negatively influenced by further deviations in the treatment. For example, parameters of the treatment solution, such as pH value and electrical conductivity, can correspond to certain defaults, but an insufficient pickling reaction is caused by other circumstances, for example excessively low spray application of the treatment solution.

Overall, monitoring the treatment solution therefore often cannot guarantee that the quality of the treatment meets the given requirements. In fact, deviations in the process, which cannot be readily detected by the known methods for monitoring the treatment solution, can lead to notable declines in the quality of the treated flat products.

EP 2 623 639 A1 and DE 20 2012 012 549 U1 disclose an aluminium alloy strip which has an increase in the luminance value of more than 5 after degreasing. Moreover, a method for degreasing an aluminium alloy strip is known from EP 2 623 639 A1.

JPH08304273 discloses a method, in which a pickling treatment of an aluminium strip is checked using colour measuring. In the case of insufficient pickling of the aluminium strip, only the parameters of the treatment solution are, however, optimised.

KR20140023693A relates to a device for assessing a pickling step of a metal strip, in particular of a steel strip, with which the pickling attack of the pickling solution can be optimised.

BRIEF SUMMARY OF THE INVENTION

Therefore, the object underlying the present invention is to indicate a method for the surface treatment of a flat product made of an aluminium alloy, wherein the method facilitates to ensure the treatment result.

The object is achieved according to a first aspect of the invention by means of a method for the surface treatment of flat products made of aluminium alloys, wherein the method comprises the steps:

pickling the flat product, in particular for degreasing the flat product;

carrying out a colour measurement on the surface of the flat product to determine at least one measured colour value after pickling the flat product;

generating output information on the basis of the at least one measured colour value, wherein the output information is indicative of compliance with at least one default for the measured colour value; and outputting or triggering the output of the output information.

The method can be carried out using a device for the surface treatment of flat products made of aluminium alloys, wherein the device comprises: means for pickling the flat product; a colorimeter, which is configured to measure the colour on the surface of the flat product to determine at least one measured colour value after pickling the flat product; and an evaluation apparatus, which is configured to generate output information on the basis of the at least one measured colour value, wherein the output information is indicative of compliance with at least one default for the measured colour value and wherein the evaluation apparatus is configured to output the output information or to trigger an output.

Furthermore, the method can also be provided by using a colorimeter, which is configured to determine at least one measured colour value, in a surface treatment of flat products made of aluminium alloys, wherein output information is generated on the basis of the at least one measured colour value and wherein the output information is indicative of compliance with at least one default for the measured colour value.

A flat product is understood in particular as a strip, a foil or a sheet made of aluminium or an aluminium alloy. The flat product is provided in particular by hot rolling and/or cold rolling a rolling ingot and optionally by at least one heat treatment. Similarly, a strip casting with subsequent cold rolling and at least one optional heat treatment can be carried out. The surface treatment can be carried out here inline with the provision of the flat product, for example continuously and after a hot rolling process and/or cold rolling process.

Examples of aluminium alloys for the flat product are alloys of the type AA 3xxx, AA 5xxx, AA 6xxx and AA 8xxx, wherein the method according to the invention is not limited to these alloy types. For example, the flat product can consist of an aluminium alloy of the type AA 5182 or an alloy of the type AA 6016.

The pickling of the flat product is carried out by means of at least one treatment solution, wherein the surface of the flat product is brought at least partially into contact with the at least one treatment solution.

Pickling can be carried out in configurations of the method in a plurality of method steps on the basis of a combination of a plurality of treatment solutions. In this case, firstly in particular at least one pickling step and then one or a plurality of rinsing steps or etching is carried out. Also in the case of separate method steps, the pickling can take place inline and, for example, a strip or sheet runs continuously from one treatment solution to the next treatment solution and optionally through one or a plurality of rinsing steps.

The flat product can be degreased before and/or at the same time as the pickling. If a degreasing step is carried out before the actual pickling step, for example with a cleaning rinse, in particular substantially no pickling attack takes place in such a pure degreasing step.

At least one measured colour value is determined by carrying out a colour measurement on the surface of the flat product. The measured colour value is at least partially indicative of the appearance of the flat product. For example, a defined illuminant forms the basis of the colour measurement. In particular, a standard illuminant is used to carry out the colour measurement, for example one of the standard illuminants A, D50, D55, D65, D75, E, F2 or F11, such as those indicated in DIN 5033 and DIN 6172 such that the results of the colour measurement are easily transferable.

At least one colour measurement is carried out after the pickling and/or during the pickling of the flat product such that the at least one determined measured colour value can be used for the process analysis and/or process control. Output information is generated on the basis of the at least one measured colour value, wherein the output information is indicative of compliance with at least one default for the measured colour value. The method can include a check of whether or not the measured colour value complies with the at least one default.

It has been recognised by means of the invention that the result of the treatment can be determined in a process-reliable and direct manner on the basis of the colour measurement on the pickled flat product. Thus, a coating with rolling residues and also near-surface structures can lead to a change in the at least one measured colour value compared to a fully treated surface of the aluminium alloy. Rolling residues can, for example, be remaining rolling oil and particles. Near-surface structures can, for example, be a microcrystalline oxide layer developing during the manufacture of the flat product, rolled-in particles, enrichments and precipitations of alloy constituents near the surface.

Deviating from the methods known in the prior art for process control, which are based on monitoring parameters of the at least one treatment solution, such as the pH value and the electrical conductivity, for example, process control of the actually achieved pickling result is made possible on the basis of an optical indicator with the method according to the invention. The treatment success and in particular a sufficient pickling attack can be assessed with high reliability on the basis of the at least one measured colour value. In this case, hidden deviations in the surface treatment, which cannot be readily recognised by means of monitoring global parameters, can also be determined, since impairments in the pickling result are reflected in the measured colour value. In particular, the problem with recognising a "dropping off" of the treatment solution outlined at the outset can also be resolved, since not only individual global characteristic values of the at least one treatment solution can be monitored, but rather the quality of the treated flat product can be directly discerned.

Errors in the process flow, which are not directly attributed to the composition of the at least one treatment solution, can also be recognised on the basis of the colour measurement, since the method in particular does not rely only on an analysis of the pickling solution itself, but rather also verifies the actual effect of the correctly adjusted pickling solution. Examples of errors in the process flow, which are not directly attributed to the composition of the at least one treatment solution, can be lack of spray application due to excessively low pressure, a defective pump or a defective spray apparatus.

An example of output information is direct information about the measured colour value or a reproduction of the measured colour value, wherein the measured colour value is indicative of the result of the pickling of the flat product. A possible default for a measured colour value is, for example, complying with, exceeding, falling short of and/or deviating from a predefined value and/or at least one interval of values and compliance with a predefined increase or reduction of a measured colour value. The output information can, for example, signal such complying with, exceeding, falling short and/or deviating or enable it to be visualised.

The measured colour value can be representative of a brightness, a colour tone and/or a colour saturation. The measured colour value can in particular be determined based on a colour space. Different colour spaces can be used as the colour space, for instance the CIELAB colour space or $L^*a^*b^*$ colour space, which is expressed in the CIE standard system. The CIELAB coordinates can, for example, be used as the coordinates of the CIELAB colour space. To further define the CIELAB colour space, reference is also made to DIN EN ISO 11664 and in particular part 4 of the standard. One or a plurality of the coordinates $L^*$, $a^*$ and $b^*$ is, for example, determined with the colour measurement.

In one configuration of the invention, a visual output of the output information is caused or triggered. In this manner, the output information can be advantageously easily and understandably reproduced. The measured colour value can be displayed directly, for example, by at least one coordinate $L^*$, $a^*$ and $b^*$ of the CIELAB colour space and/or at least one coordinate of another colour space being displayed on an output device such as a display.

A visual output can, however, also take other forms. For example, a warning system can be provided which indicates a deviation from the at least one default. In this case, an acoustic and/or optical warning can be output or an output can be caused in particular at the device for the surface treatment. For example, at least one person at the device is notified by means of an acoustic and/or optical warning that there is a deviation from the at least one default. An acoustic and/or optical warning can also be output externally or an output can be caused.

In one embodiment, a traffic light system is provided as the warning system, wherein it signals compliance with the at least one default with a first output and signals a deviation from the at least one default with a second output, which differs from the first output. Compliance with the at least one default can, for example, be signalled with a green light, while a deviation from the at least one default can, for example, be signalled with a yellow light. Optionally, a third output can be provided which signals a critical deviation from the at least one default. The third output can, for example, be signalled with a red light. It can also be provided that the surface treatment is automatically interrupted if there is a critical deviation from the at least one default.

According to the invention, the output information is characteristic of a need for error search. Error search can, for example, include the search for errors in the at least one treatment solution and errors in the process flow, which are not directly attributed to the composition of the at least one treatment solution. Errors, which cannot be recognised by checking the global parameters, are advantageously also recognised by the error search. The content of the output information relates here to a state, in particular an internal state, of the treatment device and therefore enables a process-reliable performance of the treatment of the flat product. Since the colour measurement is in particular indicative of the result of the treatment, the dynamically varying state of the treatment device or of the treatment method is recognised. An evaluation of the colour measurement or generation of the output information as to whether error search is necessary, can be carried out in one configuration of the method by a device.

According to a further configuration of the invention, an interaction with the treatment method can take place using the output information to prevent technical faults. In this case, the method makes it possible to recognise faults beyond deviations of the global parameters, for example of the treatment parameters, such as pH value and electrical conductivity of the at least one treatment solution. Errors in the process flow, which are not directly attributed to the composition of the at least one treatment solution, can also be recognised on the basis of the colour measurement. For example, mechanical errors in the treatment device can also lead to a deviation from the at least one default in the colour measurement and the output information can display the need for error search. When the at least one default for the measured colour values is complied with, the output information can indicate that error search is not necessary.

According to the invention, the method also comprises carrying out the error search. Carrying out the error search can be triggered via the output information if the output information indicates the need for error search. The error search can in this case be carried out manually, for example by at least one person, partially automatically or automatically, for example by at least one device. Carrying out the error search can advantageously quickly reinstate the process stability since errors are identified and fixed.

In a further configuration of the invention, the output information is further characteristic of whether there is compliance with at least one default parameter of the at least one treatment solution for pickling the flat product. Therefore, the error search can in particular be facilitated. If the output information is characteristic of at least one default parameter of the at least one treatment solution not being complied with, then the error search can, for example, be limited to adjusting the at least one treatment solution or adjusting the at least one treatment solution can be prioritised in the error search.

According to the invention, the output information can provide an indication that there is an error in the process flow, which is not directly attributed to the composition of the at least one treatment solution. To this end, the output information may be characteristic of at least one default parameter of the at least one treatment solution being complied with. Advantageously, the error search can be focused in this case on the process flow and the error can be found more quickly. The output information can therefore in particular be indicative of a mechanical defect. For example, a lack of spray application, a defective pump and/or a defective spray apparatus can be present. A lack of spray application can, for example, be present due to excessively low pressure.

In one configuration of the invention, the colour measurement is carried out inline with the pickling of the flat product. In particular, a continuous colour measurement is carried out, for example on the running flat product, in particular on the running strip or sheet. The colour measurement in this case makes it possible to make a direct conclusion regarding the result of the ongoing treatment such that any deviations of the result of the pickling can be determined and used promptly to suitably adapt the treatment, for example to adapt treatment parameters or to trigger an interruption to the treatment.

In particular, a colour measurement and/or generation of the output information is carried out in regular or irregular intervals. For example, colour measurements and/or generation of the output information takes place in time intervals of at most 1 hour, in particular at most 10 minutes and further in particular of at most 1 minute such that a substantially continuous monitoring of the treatment result is achieved.

The colour measurement can also be carried out at-line with the pickling of the flat product. For example, individual treated flat products, such as individual strips, sheets and/or samples taken therefrom, undergo a colour measurement, while the surface treatment continues to run. The result of the treatment can also be verified here and an intervention can be carried out promptly in the ongoing treatment if there are deviations from the at least one default.

It is also possible that a colour measurement of the flat product is carried out offline for process control, wherein individual strips, sheets and/or samples taken therefrom of already concluded treatments are examined, for example.

In one configuration of the invention, a plurality of colour measurements is carried out. For example, at least two colour measurements can be carried out at the same point of the method in order to measure different positions of the flat product, for example over the run length of the strip and/or along the width of the strip or sheet. The evenness of the surface treatment can be hereby checked, in particular the evenness of the surface treatment over the width of the flat product.

Similarly, a plurality of colour measurements can be provided, which carry out, for example, at least one colour measurement between different method steps of the pickling. Therefore, the intermediate result of the pickling on the flat product can also be checked via the colour measurement and the process control can be improved in the case of pickling processes with a plurality of steps.

In one configuration of the invention, the flat product is pickled with at least one treatment solution and the at least one treatment solution contains at least two acids or at least two bases. Consequently, a plurality of acids or bases are present which can indirectly or directly cause a pickling attack on the surface of the flat product. For example, the at least one treatment solution contains at least two different mineral acids, for example $H_2SO_4$ and HF. In the case of the at least one treatment solution comprising at least two acids or bases, monitoring of the global parameters, such as pH value and/or electrical conductance, is problematic since statements about the concentration and effect of the individual acids or bases can only be made to a limited extent hereby. By carrying out a colour measurement on the surface of the flat product, it can, however, be possible to make a statement about the effect of the individual acid or base. For example, the output information can be indicative of the concentration of an acid or base and/or indicative of the relationship of the concertation between at least two acids or bases. The concentration of an acid can, for example, be the concentration of HF in the at least one treatment solution comprising $H_2SO_4$ and HF.

If, according to one configuration, flat product is pickled at least partially under a chemical reaction, wherein at least one self-inhibiting process occurs in the chemical reaction, the effect of the pickling can be advantageously assessed with the method according to the invention, whereas using global parameters, such as pH value, electrical conductance, the Al concentration and/or the concentration of individual components of the at least one treatment solution, it is perhaps not possible to provide a definite statement regarding the effectiveness of the pickling treatment. A self-inhibiting process is understood here as a chemical reaction in which intermediate products and/or end products of the reaction reduce and/or slow down the pickling attack of the at least one treatment solution, for example by a reaction of the intermediate and/or end products with an acid or base of the at least one treatment solution and/or by a coating of the surface of the flat product.

Likewise, in one configuration of the invention, the output information can be indicative of the degree of the self-inhibiting process. It has been found that the quality of the pickling can be easily monitored using the degree of the self-inhibiting process. For example, the at least one measured colour value can, to this end, be compared with at least one global parameter or with at least one parameter of the at least one treatment solution.

According to another configuration, at least one concentration of a component of the at least one treatment solution is monitored, wherein a conclusion can be drawn about the degree of a self-inhibiting process if there are deviations of the output information from the at least one default. In this manner, a decision can be advantageously quickly made during the error search as to whether the output information can be attributed to a self-inhibiting process or a lack of a component of the at least one treatment solution. The concentration of a component of the at least one treatment solution can, for example, be an acid concentration or a lye concentration.

In one configuration of the invention, the colour measurement of the surface is carried out in the CIE L*a*b* colour space excluding the direct reflection in 45°/0° geometry using a standard illuminant D65 and a viewing angle of 10° and at least one of the coordinates L*, a* and b* is determined in particular as a measured colour value.

In another configuration of the invention, the production of the output information includes a comparison of the at least one measured colour value with at least one reference value. For example, at least one reference value is stored and an evaluation apparatus is configured to compare the at least one measured colour value with at least one reference value. A default for the measured colour value can, for example, be that at least one reference value is complied with, exceeded, fallen short of and/or there is a deviation from the at least one reference value. Similarly, it can be checked on the basis of the at least one reference value whether the at least one measured colour value is one which is within or outside of an interval predefined by reference values.

In another configuration, the at least one reference value is at least partially predefined as a function of the aluminium alloy of the flat product, of the dimensions of the flat product, of the surface structure of the flat product and/or of the manufacture of the flat product. Advantageously, the method or the device can therefore be easily used for different flat products. For example, different reference values are stored for different flat products, in particular in a database. It can be hereby taken into account that different flat products must also meet different requirements on the surface. For example, a distinction can be made between internal applications, external skin applications, structural applications and/or decorative applications depending on the intended use.

In particular, the at least one reference value is indicative of a brightness, a colour tone and/or a colour saturation. In particular, a minimum value and/or a maximum value is indicated for the brightness, the colour tone and/or the colour saturation. For example, a minimum value and/or maximum value is predefined for one or a plurality of the CIELAB coordinates L*, a* and b*.

The comparison of the at least one measured colour value with the at least one reference value can include determining a brightness difference and/or determining a colour distance. A brightness difference is, for example, determined by means of the difference in luminance L* between the measured colour value and the reference value. The colour distance is, for example, formed using the Euclidean colour distance $\Delta E$, where $\Delta E=[(\Delta L^*)^2+(\Delta a^*)^2+(\Delta b^*)^2]^{1/2}$. A minimum value or maximum value of the colour distance $\Delta E$ and/or the brightness difference $\Delta L$ can, for example, also have to be complied with.

The method can also include determining at least one reference value, for example on a treated flat product, which meets the requirements for the result of the treatment.

In another configuration of the invention, the method further comprises: carrying out a previous colour measurement on the surface of the flat product before the pickling and/or between pickling steps to determine at least one previous measured colour value, wherein the output information is further generated on the basis of the at least one previous measured colour value. The device according to the second aspect can have a previous colorimeter which is configured to measure the colour on the surface of the flat product before the pickling and/or between treatment steps or pickling steps. A previous colour measurement can deliver a comparison here of the appearance before and after the surface treatment or before and after individual steps of the surface treatment. Therefore, the influence of the surface treatment can be checked through a direct comparison.

The at least one default for the measured colour value can, for example, be influenced by the previous measured colour value. For example, a default may be that a certain difference between the measured colour value and the previous measured colour value is complied with, exceeded and/or fallen short of. If at least one reference value is used, the at least one reference value can, for example, be indicative of a criterion of a comparison of the measured colour value with the previous measured colour value.

In one configuration, a flat product made of an aluminium alloy of the type AA 5xxx, in particular AA 5182 is treated, wherein a luminance L* of at least 58, in particular at least 60, is adjusted. Accordingly, at least one default for the measured colour value can be that a luminance L* of at least 58, in particular at least 60, is complied with. For example, at least one treatment parameter of the pickling is changed, until the luminance L* is at least 58, in particular at least 60. A treatment parameter of the pickling can, for example, be a concentration of a chemical in the at least one treatment solution. It has been recognised that the quality of the treated surface and in particular the completeness of the surface treatment can be recognised in a process-reliable manner on the basis of the luminance L* in the case of alloys of the type AA 5xxx, in particular AA 5182. A minimum value of the luminance L* of 58, in particular of 60, in this case, indicates an optimal surface treatment. The colour measurement is in this case carried out in the CIE L*a*b* colour space excluding the direct reflection in 45°/0° geometry using a standard illuminant D65 and a viewing angle of 10°.

In an alternative configuration, a flat product made of an aluminium alloy of the type AA 6xxx, in particular AA 6016 is treated, wherein a luminance L* of at least 62, in particular at least 64, is adjusted. Accordingly, at least one default for the measured colour value can be that a luminance L* of at least 62, in particular at least 64 is complied with. For aluminium alloys of the type AA 6xxx, in particular AA6016, a higher minimum value for the luminance L* of 62 and in particular of 64 results with an optimal surface treatment, compared to the alloys of the type AA 5xxx. The colour measurement is in this case carried out in the CIE L*a*b* colour space excluding the direct reflection in 45°/0° geometry using a standard illuminant D65 and a viewing angle of 10°.

In another configuration, the pickling is carried out by means of at least one alkaline treatment solution, in particular by means of at least one alkaline treatment solution comprising NaOH and/or surfactants. For example, at least one aqueous treatment solution is used. Sodium hydroxide can be added to the at least one aqueous treatment solution such that the concentration of sodium hydroxide in the at least one aqueous treatment solution is 0.01 to 5% by weight, preferably 0.1 to 1.5% by weight, particularly preferably 0.5 to 0.7% by weight. Surfactants can be used in concentrations of 0.1 to 1.0% by weight, preferably 0.3 to 0.6% by weight. The at least one aqueous treatment solution can optionally also contain 1.5 to 3% by weight of a composition of 5 to 40% by weight sodium tripolyphosphate, 3 to 10% by weight sodium gluconate, 3 to 8% by weight of a composition of non-ionic and anionic surfactants and optionally 0.5 to 70% by weight sodium carbonate, preferably to 70% by weight sodium carbonate. Corresponding treatment solutions have proven particularly effective in degreasing and removing surface enrichments. The addition of sodium carbonate can be used to adjust the pH value of the at least one treatment solution instead of the caustic soda lye. The composition can, for example, be varied within the mentioned ranges as a function of the at least one measured colour value if a deviation from at least one default for the measured colour value is determined by the output information. The temperature of the treatment bath, the contact time and/or the spray pressure can also be increased or reduced as a function of the at least one measured colour value.

In another configuration, the pickling includes a treatment by means of at least one acidic treatment solution, in particular by means of at least one acidic treatment solution comprising a mineral acid and optionally adding at least one complexing agent and/or optionally adding at least one surfactant.

According to one configuration, the pickling includes a rinse. For example, pickling is carried out by means of an alkaline treatment solution, for example as described above, wherein an acid rinse or etching of the flat product treated with the at least one alkaline treatment solution is carried out subsequently. Finally, at least one rinsing step with desalinated and/or demineralised water can be carried out.

$H_2SO_4$, $HNO_3$ and HCl can be used as mineral acids, amongst others. The concentration of the mineral acids is in particular 1 to 10% by weight, preferably 2.5 to 3.5% by weight. HF and $H_3PO_4$ are, for example, used as complexing mineral acids. The concentration of HF can, for example, be in the range of 20 ppm to 3% by weight. The concentration of $H_3PO_4$ can, for example, be in the range of 0.1% to 20% by weight. It is also possible to use short-chain carbonic acids, such as formic acid, for example.

Fluorides, citrates, oxalates or phosphates can, amongst other things, be used as complexing agents. Complexing agents such as fluorides can in particular be used with concentrations of 100 to 1500 mg/l, preferably with 300 to 600 mg/l.

In another configuration, at least one treatment parameter of the pickling is also at least partially regulated on the basis of the at least one measured colour value. For example, the at least one measured colour value is evaluated and at least one treatment parameter is maintained or changed on the basis of the evaluation. A regulation can in this case be carried out manually or partially automatically.

If the pickling includes a plurality of method steps, individual pickling steps can also be regulated manually or partially automatically independently of one another, for example by means of previous colour measurements between treatment steps or pickling steps. In configurations of the method, the treatment parameters of a pickling step can also be kept constant, while the treatment parameters of the other pickling step are regulated on the basis of the colour measurement. Thus, for example, a pickling step with constant or manually adjusted treatment parameters is carried out and at least one treatment parameter of a subsequent (acid) rinse is regulated on the basis of the colour measurement. Conversely, at least one treatment parameter of the pickling step can also be regulated on the basis of the colour measurement and an (acid) rinse with constant or manually adjusted treatment parameters can be carried out.

In another configuration of the invention, at least one treatment parameter is regulated which is indicative of at least one lye concentration, at least one acid concentration, at least one fluoride concentration, at least one surfactant concentration, a speed of the flat product relative to the at least one treatment solution, a temperature of the at least one treatment solution, a spray pressure of the at least one treatment solution and/or the volume of the at least one treatment solution.

The reaction speed can typically be influenced with the at least one acid concentration and/or at least one lye concentration. In particular, there may be a correlation of measured colour values with the acid concentration and/or lye concentration. For example, higher acid concentrations and/or lye concentrations can each, generally speaking, lead to higher brightness values or luminances or to certain colour tones which are characteristic of a fully treated surface. The at least one acid concentration and/or at least one lye concentration can therefore, for example, be optimised on the basis of the at least one measured colour value, for instance by a manual or partially automatic regulation being carried out.

In a similar manner, at least one fluoride concentration and/or at least one surfactant concentration can have a correlation with the at least one measured colour value. For example, higher fluoride concentrations and/or surfactant concentrations can each, generally speaking, also lead to higher brightness values or to certain colour tones, which are characteristic of a fully treated surface.

A reduction of the effect of pickling can take place from certain acid concentrations and/or lye concentrations, for instance if full cleaning and removal of the surface takes place such that the properties of the visible surface are determined substantially by the properties of the core of the flat product. This effect can also be determined by means of the colour measurement according to the invention such that any unnecessarily high acid concentration and/or lye concentration can be avoided and therefore chemicals can be spared.

The lye concentration, acid concertation, fluoride concentration and/or surfactant concentration are regulated in particular such that an optimised measured colour value is obtained and optionally the respective concentration is kept as low as possible at the same time to reduce the consumption of chemicals. An optimised measured colour value can, for example, be representative of a surface that is fully treated as far as possible. Similarly, a constant treatment speed can, for example, be maintained with the regulation of the concentrations in order to ensure a uniformly running production. A constant treatment speed and therefore a constant contact time with the at least one treatment solution can, for example, be a constant transit speed of a strip through a bath.

A speed of the flat product relative to the at least one treatment solution is, for example, understood as the speed of the flat product relative to a bath with a treatment solution or to a spray apparatus. The volume of the at least one treatment solution represents in particular a sprayed volume of a spray application of the at least one treatment solution. The spray pressure can be regulated with the delivery volume of the pumps. In this way, a possible saving of energy results when carrying out the method.

In one configuration, at least one treatment parameter is increased with greater brightness difference and/or greater colour distance and/or decreased with lower brightness difference and/or lower colour distance. If the reference value, for example, corresponds to determined targets, the at least one lye concentration, the at least one acid concentration, the at least one fluoride concentration and/or the at least one surfactant concentration can in particular be adapted in order to minimise a brightness difference and/or a colour distance. The determined targets can, for example, be a measured colour value of a fully treated surface. In particular, higher concentrations typically lead to a quicker reaction such that with greater deviations of the brightness and/or of the colour, the concentration can be increased. If the treatment parameter and in particular the concentration is decreased with lower brightness differences and/or smaller colour distances, chemicals can be spared.

In another configuration of the invention, the means for pickling the flat product are designed as a treatment bath and/or a spray apparatus. For example, the flat product is designed as a strip, wherein the strip passes through a bath with the at least one treatment solution. Similarly, flat products designed as sheets can be dipped into a bath. A spray apparatus can be configured for a spray application of the at least one treatment solution on at least one side of the flat product. For example, a spray application is carried out on at least one side of a running flat product, for example of a running strip or sheet.

The exemplary configurations of the present invention previously described in this specification shall also be understood as being disclosed in all combinations with one another. In particular, exemplary configurations shall be understood as being disclosed in relation to the different aspects. In particular, through the previous or the following description of method steps according to preferred embodiments of a method, corresponding means to carry out the method steps shall be disclosed through preferred embodiments of a device. Similarly, by disclosing means of a device for carrying out a method step, the corresponding method step shall also be disclosed.

BRIEF DESCRIPTION OF THE DRAWINGS

Further configurations and advantages of the invention can be inferred in the following detailed description of some exemplary embodiments of the present invention, in particular in conjunction with the drawing. In the drawing.

DETAILED DESCRIPTION OF THE INVENTION

Figure 1:
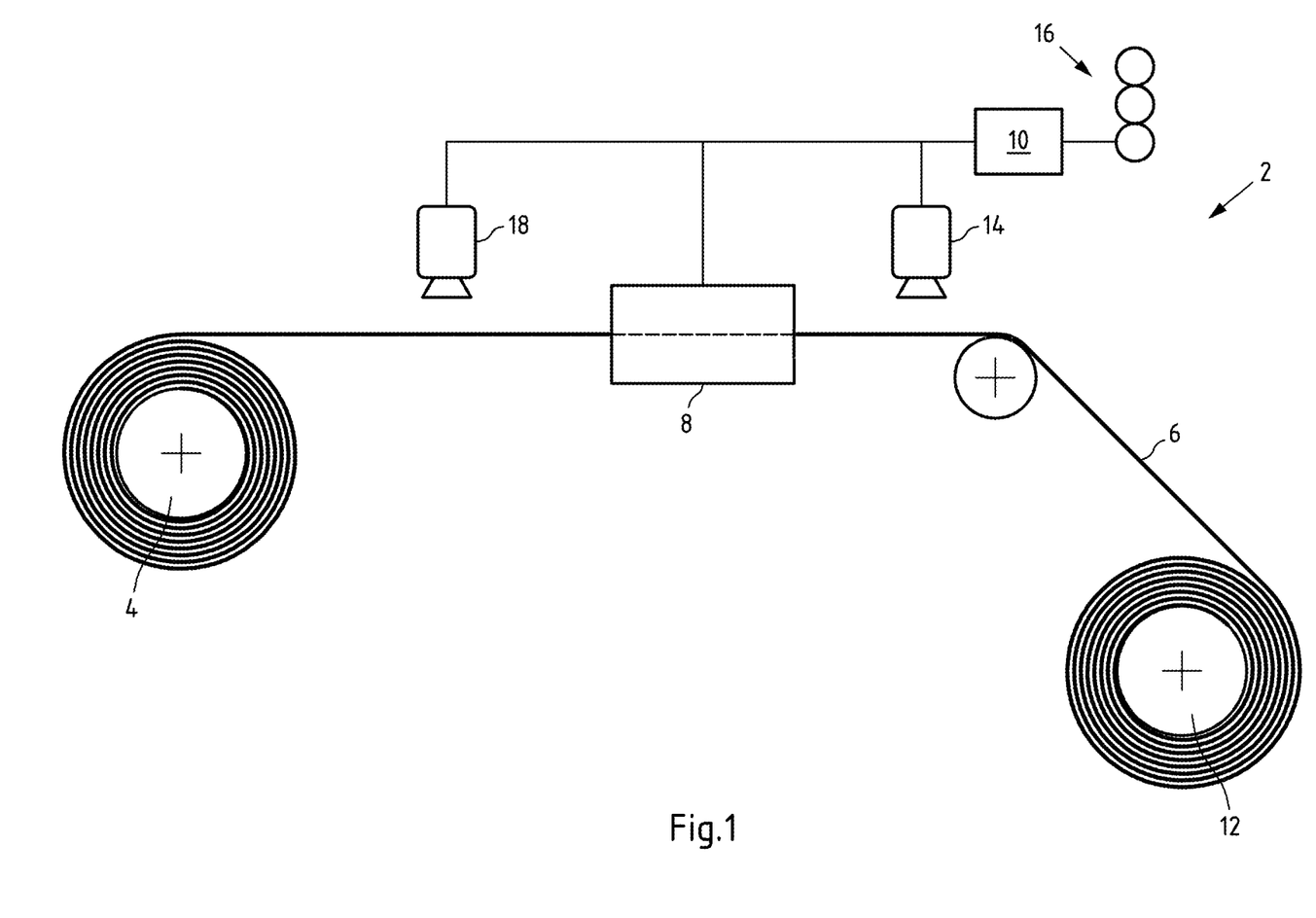
FIG. 1 shows a schematic representation of an exemplary embodiment of a device according to the invention.

FIG. 1 shows a schematic representation of an exemplary embodiment of a device 2 according to the invention. The device 2 has a first coil 4, from which a flat product 6 designed as an aluminium alloy strip is unrolled. Means 8 for pickling the flat product 6 are provided which are designed as an immersion bath and/or as a spray apparatus, wherein the flat product 6 comes into contact with at least one treatment solution for pickling.

The pickling is carried out by means of at least one alkaline treatment solution comprising NaOH and surfactants, wherein the concentration for NaOH is 0.5 to 0.7% by weight and for surfactants is 0.3 to 0.6% by weight. Then, an acid rinse is carried out by means of at least one treatment solution comprising $H_2SO_4$ and/or $HNO_3$ with optional addition of HF as fluorides as complexing agents. The acid concentration is in this case 2.5 to 3.5% by weight and the fluoride concentration is 300 to 600 mg/l. After the treatment is carried out, the flat product 6 is wound onto a second coil 12.

According to the invention, a colorimeter 14 is now provided which is configured to measure the colour on the surface of the flat product 6 to determine at least one measured colour value. The colorimeter 14 is arranged in the running direction of the strip after the means 8 for pickling such that a colour measurement is carried out after pickling the flat product 6. The colour measurement is carried out inline with the pickling of the flat product 6.

An evaluation apparatus 10 is provided, which is configured to generate output information on the basis of the at least one measured colour value. The generation of the output information in this case includes a comparison of the at least one measured colour value with at least one reference value. For example, the colour measurement of the surface is carried out in the CIE L*a*b* colour space and the luminance L* is determined as the measured colour value.

The output information is in this case indicative of compliance with at least one default for the measured colour value, wherein a reference value is predefined. In the present case, it is checked whether the luminance L* complies with a minimum value to be complied with, wherein the minimum value is predefined on the basis of the aluminium alloy of the flat product.

In an optional configuration, a previous colour measurement is carried out on the surface of the flat product 6 by means of the previous colorimeter 18. The generation of the output information can also be carried out on the basis of the at least one previous measured colour value, wherein a brightness difference is formed between the luminance L* before and after the treatment. An additional default can, for example, be that a minimum value of the brightness difference is also to be complied with.

The output information is output to a display 16. The display 16 is, for example, designed as a traffic light and displays green when there is compliance with at least one default. A yellow signal of the traffic light moreover indicates a deviation from the at least one default. Additionally, a red signal can be provided which signals a critical deviation, wherein the treatment is also automatically stopped when a critical deviation occurs. The effectiveness of the surface treatment can be determined here with high reliability on the basis of the colour measurement on the treated flat product 6.

The output information can therefore be characteristic of a need for error search. If it is displayed via the output information that error search is caused, a corresponding error search can be carried out. For example, the output information is also characteristic of compliance with default parameters of the at least one treatment solution for pickling, such as for instance the pH value and/or the electrical conductivity such that, during the error search, checking the device for mechanical defects can be prioritised.

At least one treatment parameter of the pickling can be manually regulated at least partially on the basis of the at least one measured colour value. This regulation is carried out at least partially based on the output information.

For example, when there is a deviation from the at least one default in the current treatment, an intervention can be carried out by individual treatment parameters of the at least one treatment solution being manually adapted. To this end, a yellow signal can, for example, be used. If there is a critical deviation, the device for the treatment can be checked further and the treatment can be continued after error search and correction of the error. A red signal can, for example, be used for this purpose.

Figure 2:
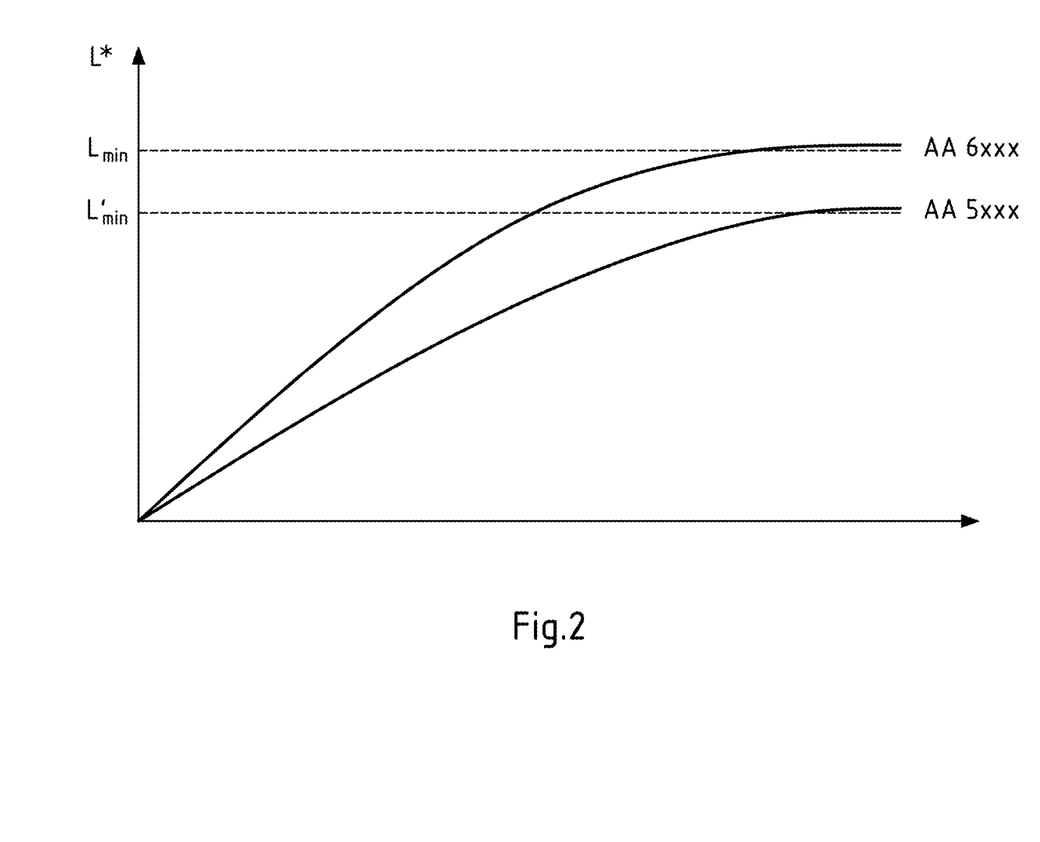
FIG. 2 shows a schematic diagram regarding the dependence of the achieved luminance as a function of a treatment parameter.

For further explanation, a schematic diagram regarding the dependence of the achieved luminance, which is plotted as the ordinate, of aluminium alloys of the type AA 5xxx and AA 6xxx as a function of a treatment parameter, which is plotted as the abscissa, is shown in FIG. 2. With a greater treatment parameter, there is, generally speaking, a greater luminance L*, which results from a more complete pickling with a further removal of the oxide layer, intermetallic phases, rolled-in particles and near-surface enrichments. What is problematic with methods from the prior art in this case is that the kinetics of the pickling reaction can depend on a plurality of parameters since self-inhibiting processes also occur with the treatment, for example by the enrichment of reaction-inhibiting accompanying substances.

Optimal treatment parameters can be adjusted here with the colour measurement on the surface of the treated flat product, and the regulation can also be used for a plurality of different flat products. The different flat products can, for example, have different alloys, manufacturing methods and geometries.

For example, a comparison of the at least one measured colour value with at least one reference value is carried out. The at least one reference value is determined as a function of the aluminium alloy of the flat product 6, wherein a value $L_{min}$ is predefined for alloys of the types AA 6xxx and a value $L'_{min}$ is predefined for alloys of the types AA 5xxx. The value $L'_{min}$ for the alloys of the types AA 5xxx is, in this example, lower than the value $L'_{min}$ for the alloys of the types AA 6xxx. For example, a concentration, such as a lye concentration or acid concentration, can be adjusted in the at least one treatment solution, not only on the basis of an absolute value, but rather it is selected such that the minimum values of the luminance $L_{min}$ or $L'_{min}$ are achieved with a concentration that is simultaneously as low as possible.

Additionally, the luminance L* has been measured on flat products from different aluminium alloys under different treatment parameters. The colour measurement of the surface is carried out in the CIE L*a*b* colour space excluding the direct reflection in 45°/0° geometry using a standard illuminant D65 and a viewing angle of 10°.

Results for the luminance L* for flat products made of the alloy AA 5182 are compiled in Table 1.

TABLE 1

| AA 5182 Example | L* | Alkaline degreasing/pickling | | Acid rinse/etching | | Result |
|---|---|---|---|---|---|---|
| | | NaOH [% by weight] | Surfactant [% by weight] | Etching acid [% by weight] | Fluoride concentration [mg/l] | |
| 1 | 60 | 0.8 | 0.5 | 3.2 | 329 | + |
| 2 | 60 | 0.8 | 0.5 | 3.2 | 329 | + |
| 3 | 60 | 0.8 | 0.5 | 3.2 | 329 | + |
| 4 | 60 | 0.8 | 0.5 | 3.2 | 329 | + |
| 5 | 59 | 0.8 | 0.5 | 3.2 | 329 | + |
| 6 | 60 | 0.7 | 0.7 | 3.0 | 344 | + |
| 7 | 60 | 0.7 | 0.7 | 3.0 | 344 | + |
| 8 | 58 | 0.7 | 0.7 | 3.0 | 344 | + |
| 9 | 56 | 0.8 | 0.3 | 2.9 | 359 | − |
| 10 | 54 | 0.7 | 0.3 | 2.9 | 212 | − |
| 11 | 55 | 0.7 | 0.3 | 2.9 | 212 | − |

The surfaces of the examples 1-8, which have a satisfactory treatment and therefore a complete removal of the rolling residues, the oxide layer as well as particles and enrichments, are marked here with a result "+". The examples 9-11, in contrast, exhibit an inadequate treatment of the surface with a result "−", which in particular can be attributed to an excessively low surfactant concentration in the alkaline treatment zone and a somewhat lower acid concentration during rinsing or etching.

However, the quality of the treated surface can be determined on the basis of the values for the luminance L*, wherein the positive results of the treatment for the alloy of the type AA 5182 achieve values for the luminance of 58 and in particular 60. For example, a corresponding deviation can be indicated with the present method. For example, the acid concentration can be manually or partially automatically regulated during etching on the basis of the measured luminance L* such that the mentioned values of the luminance are achieved.

Further results for the luminance L* for flat products made of the alloy AA 6016 are compiled in Table 2.

TABLE 2

| AA 6016 Example | L* | Alkaline degreasing/pickling | | Acid rinse/etching | | Result |
|---|---|---|---|---|---|---|
| | | NaOH [m/m %] | Surfactant [m/m %] | Etching acid [m/m %] | Fluoride concentration [mg/l] | |
| 12 | 64 | 0.8 | 0.3 | 2.9 | 378 | + |
| 13 | 62 | 0.7 | 0.4 | 3.1 | 300 | + |
| 14 | 62 | 0.7 | 0.7 | 3.0 | 344 | + |
| 15 | 63 | 0.7 | 0.7 | 3.0 | 344 | + |
| 16 | 62 | 0.7 | 0.7 | 3.0 | 344 | + |
| 17 | 62 | 0.7 | 0.7 | 3.0 | 344 | + |
| 18 | 62 | 0.6 | 0.3 | 3.5 | 284 | + |
| 19 | 62 | 0.6 | 0.3 | 3.5 | 284 | + |
| 20 | 57 | 0.8 | 0.7 | 2.7 | 277 | − |
| 21 | 59 | 0.8 | 0.2 | 3.3 | 495 | − |
| 22 | 60 | 0.7 | 0.4 | 2.8 | 358 | − |

A positive treatment result has shown here for the examples 12-19, while the treatment for the examples 20-22 is only inadequate. For the examples 20 and 22, it can be assumed that the negative result is associated with an excessively low acid concentration during etching. Example 20 has also been etched with an excessively low fluoride concentration. Example 21 is, in contrast, treated with comparatively high concentrations during etching, wherein a low surfactant concentration is present, however, during pickling/degreasing.

A conclusion regarding the result of the treatment on the basis of the luminance L* can also be made here, wherein the values for the luminance L* of the positive examples 12-19 are at least 62 and in particular at least 64.

The method therefore enables the treatment of a plurality of flat products made of different aluminium alloys, wherein reference values such as minimum luminance L* to be achieved, for example, are determined on the basis of the properties of the flat products.

Table 3 shows, in relation to the possible variation of the values for the luminance L*, colour measurements on alloys of the types AA 5754 and AA 6451. Comparatively high values for the luminance L* of at least 68 are achieved with a positive treatment result on alloys of the types AA 5754. Comparatively low minimum values for the luminance L* of at least 55 are achieved with a positive treatment result on alloys of the types AA 6451. The luminance values for alloys of the types AA 6451 are here also lower than luminance values, which are usually obtained for other alloys of the type AA 6xxx.

TABLE 3

| Alloy | L* | Alkaline degreasing/pickling NaOH [m/m %] | Alkaline degreasing/pickling Surfactant [m/m %] | Acid etching Etching acid [mg/l] | Acid etching Fluoride concentration [mg/l] | Result |
|---|---|---|---|---|---|---|
| AA 5754 | 74 | 0.8 | 0.3 | 2.9 | 378 | + |
| AA 5754 | 71 | 0.8 | 0.3 | 2.9 | 378 | + |
| AA 5754 | 68 | 0.8 | 0.3 | 2.9 | 359 | + |
| AA 5754 | 68 | 0.8 | 0.3 | 2.9 | 359 | + |
| AA 6451 | 57 | 0.8 | 0.3 | 2.9 | 378 | + |
| AA 6451 | 56 | 0.8 | 0.3 | 2.9 | 378 | + |
| AA 6451 | 56 | 0.8 | 0.4 | 3.6 | 326 | + |
| AA 6451 | 55 | 0.8 | 0.4 | 3.6 | 326 | + |

In addition to the luminance L*, other measured colour values can also be used for assessing the effect of the treatment. To this end, Table 4 shows an overview of measured colour values together with an assessment of the treatment result.

The colour measurement was carried out in this case after the treatment. The flat products consist of an alloy of the type AA 6016.

For example, b* can also be used here as the measured colour value in order to obtain output information indicative of compliance with at least one default. In the measurement series of Table 4, for example, lower values for b* and in particular values of b* below 10.0 or 8.0 are indicative of a good treatment result.y Similarly, ΔE* can alternatively or cumulatively be used for the assessment, wherein a maximum distance to a reference pattern and/or a minimum distance to a colour measurement before the surface treatment displays a good treatment result. The maximum distance to a reference pattern is a lower value of ΔE*. The minimum distance to a colour measurement before the surface treatment corresponds to higher values of ΔE*.

In Table 5a, another example of a treatment comprising the pickling of a flat product made of an alloy of the type AA 5182 is shown, which takes place under a chemical reaction, wherein a self-inhibiting process occurs in the chemical reaction. In this case, the treatment parameters detectable online have been automatically regulated during the treatments and kept in a predefined interval. The treatment parameters detectable online are, for example, the conductivity of the at least one alkaline treatment solution for degreasing/pickling and the conductivity of the at least one acid treatment solution for rinsing. The treatment parameters detectable online are recorded for different times on the same day in Table 5a.

Treatment parameters have also been collected discontinuously in an offline measurement, which parameters are reproduced in Table 5b. The concentrations measured here were also in the respectively predefined intervals.

Due to the occurrence of self-inhibiting processes, the pickling attack of the at least one treatment solutions can be reduced or slowed down, which can lead to an insufficient treatment result. The self-inhibiting processes can lead to a latent effect such as a "dropping off" of the at least one treatment solution, for example. The effect of the self-inhibiting processes may prevent a definite statement regarding the pickling result on the basis of global parameters that are detectable online such as the electrical conductivity and the pH value, and non-continuously determinable treatment parameters such as Al concentration or the concentration of the individual components of the at least one treatment solution. It can be discerned from Table 5a that, in spite of the substantially constant treatment parameters for the at least one treatment solution, the pickling attack on the flat product varied and notably decreased within a few hours.

For the brightness L* however, there was a good correlation with the treatment result, such that based on the measured colour values, output information can be made available which is characteristic of the need for error search. The output information can also be characteristic of compliance with the default parameters of the at least one treatment solution for the treatment of the flat product such as from Tables 5a and 5b, for example.

Another example of a treatment comprising the pickling of flat products made of alloys of the type AA 5754 and of the type AA 5182 is shown in Table 6a. The times noted in Table 6a relate to a different day to the measurements shown in Table 5a. The treatment parameters that are detectable discontinuously and offline are reproduced in Table 6b.

The difference in the brightness values L* between 19:42 and 20:33 is at least partially due to the change of the alloys, wherein both brightness values still indicate a good treatment result. The brightness value L* of the third measurement at 21:03, however, both in comparison to the previously manufactured alloy of the same type and in comparison to a reference value for L* of at least 58, in particular does not comply with a default for the brightness value.

The brightness measurement L* therefore allows to conclude that in the time period between 20:33 and 21:03 a problem must have occurred, since the lower brightness is indicative of an excessively low pickling attack. Accordingly, output information could be generated that is characteristic of the fact that error search is necessary. The output information could also be characteristic of the fact that the measured treatment parameters of the at least one treatment solutions maintained are compliant with the default parameters.

In error search triggered at this point, a defective spray ring was able to be identified, whose failure would not have been readily noticed if relying solely on the chemical analyses of the baths.

TABLE 4

| | Measured colour values | | | | Alkaline degreasing/pickling | | | Acid etching | | | |
|---|---|---|---|---|---|---|---|---|---|---|---|
| Alloy | L* | a* | b* | ΔE* | NaOH [m/m %] | Surfactant [m/m %] | Al concentration [g/l] | Etching acid [m/m %] | Fluoride concentration [mg/l] | Al-concentration [g/l] | Result |
| AA6016 | 64 | −9.3 | 7.8 | 32 | 0.6 | 0.5 | 1.4 | 3.3 | 378 | 1.8 | + |
| AA6016 | 64 | −9.2 | 8.0 | 32 | 0.6 | 0.3 | 1.2 | 3.0 | 460 | 1.0 | + |
| AA6016 | 57 | −20.8 | 16.0 | 43 | 0.5 | 0.4 | 0.2 | 2.8 | 326 | 0.9 | − |

TABLE 5a

| Time | Alloy | L* | Conductivity (alkaline) [mS/cm] | Conductivity (acid) [mS/cm] |
|---|---|---|---|---|
| 18:48 | AA5182 | 56 | 34.2 | 104.6 |
| 19:29 | AA5182 | 54 | 34.6 | 103.7 |
| 20:57 | AA5182 | 50 | 34.5 | 103.6 |

TABLE 5b

| Al concentration (alkaline) [g/l] | Lye concentration [m/m %] | Surfactant concentration [m/m %] | Al concentration (acid) [g/l] | Fluoride concentration [mg/l] | Acid concentration [m/m %] |
|---|---|---|---|---|---|
| 1.4 | 0.8 | 0.6 | 0.6 | 512 | 3.1 |

TABLE 6a

| Time | Alloy | L* | Conductivity (alkaline) | Conductivity (acid) [mS/cm] | Result |
|---|---|---|---|---|---|
| 19:42 | AA5754 | 68 | 33.1 | 97.8 | + |
| 20:33 | AA5182 | 63 | 33.8 | 98.5 | + |
| 21:03 | AA5182 | 56 | 34.6 | 97.9 | − |

TABLE 6b

| Al concentration (alkaline) [g/l] | Lye concentration [m/m %] | Surfactant concentration [m/m %] | Al concentration (acid) [g/l] | Fluoride concentration [mg/l] | Acid concentration [m/m %] |
|---|---|---|---|---|---|
| 1.8 | 0.8 | 0.3 | 0.4 | 367 | 2.9 |

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. Method for the surface treatment of flat products made of aluminium alloys, the method comprising:
    pickling the flat product;
    carrying out a colour measurement on the surface of the flat product using a colorimeter to determine at least one measured colour value after pickling the flat product;
    generating output information on the basis of the at least one measured colour value, wherein the output information is indicative of compliance with at least one default for the measured colour value, wherein generation of the output information includes a comparison of the at least one measured colour value with at least one stored reference value using an evaluation apparatus;
    outputting or triggering the output of the output information, wherein the output information is characteristic of a need for an error search;
    wherein the output information is indicative of an error in the process flow, which is not directly attributed to a composition of at least one treatment solution for the pickling;
    wherein the error in the process flow, which is not directly attributed to a composition of the at least one treatment solution for the pickling, is a mechanical defect in a treatment device, wherein the output information is indicative of a degree of a self-inhibiting process, wherein a self-inhibiting process is a chemical reaction in which intermediate products and/or end products of the reaction reduce and/or slow down a pickling attack of the at least one treatment solution; and
    carrying out the error search, wherein the error search includes the search for a mechanical defect in the treatment device and/or the search for a self-inhibiting process, wherein carrying out the error search comprises error identification and error fixing, wherein error fixing comprises fixing a mechanical defect and/or adjusting the treatment solution.

2. Method according to claim 1, wherein the output information is further characteristic of whether there is compliance with at least one default parameter of the at least one treatment solution for the pickling of the flat product.

3. Method according to claim 1, wherein at least one concentration of a component of the at least one treatment solution is monitored wherein, if there are deviations of the output information from the at least one default, a conclusion is drawn about the degree of the self-inhibiting process.

4. Method according to claim 1, wherein the colour measurement is carried out inline and/or at-line with the pickling of the flat product.

5. Method according to claim 1, wherein outputting or triggering the output of the output information comprises causing or triggering a visual output of the output information.

6. Method according to claim 1, wherein, using the output information, an interaction with the treatment method takes place to avoid technical faults.

7. Method according to claim 1, wherein the at least one treatment solution for the pickling contains at least two acids or at least two bases.

8. Method according to claim 1, wherein the at least one reference value is predefined at least partially as a function of the aluminium alloy of the flat product, of the dimension of the flat product, of the surface structure of the flat product and/or of the manufacture of the flat product.

9. Method according to claim 1, wherein the comparison of the at least one measured colour value with the at least one reference value includes determining a brightness difference and/or determining a colour distance.

10. Method according to claim 1, further comprising:
    carrying out a previous colour measurement on the surface of the flat product before the pickling and/or between pickling steps to determine at least one previous measured colour value,
    wherein the output information is further generated on the basis of the at least one previous measured colour value.

11. Method according to claim 1, wherein the colour measurement of the surface is carried out in CIE L*a*b* colour space, wherein luminance L* is determined as the measured colour value;
    Wherein a flat product made of an aluminium alloy of the type AA 5xxx is treated and the at least one default for the measured colour value is a luminance L* of at least 58.

12. Method according to claim 1, wherein the colour measurement of the surface is carried out in CIE L*a*b* colour space, wherein luminance L* is determined as the measured colour value;
    wherein a flat product made of an aluminium alloy of the type AA 6xxx is treated and the at least one default for the measured colour value is a luminance L* of at least 62.

13. Method according to claim 11, wherein a flat product made of an aluminium alloy of the type AA5182 is treated.

14. Method according to claim 11, wherein the at least one default for the measured colour value is a luminance L* of at least 60.

15. Method according to claim 12, wherein a flat product made of aluminium alloy of the type AA6016 is treated.

16. Method according to claim 12, wherein the at least one default for the measured colour value is a luminance L* of at least 64.

* * * * *